US012048988B2

(12) United States Patent
Kohls et al.

(10) Patent No.: US 12,048,988 B2
(45) Date of Patent: Jul. 30, 2024

(54) IMPACT MECHANISM FOR A ROTARY IMPACT TOOL

(71) Applicant: Snap-on Incorporated, Kenosha, WI (US)

(72) Inventors: Collin T. Kohls, Kenosha, WI (US); Adrian J. Robillard, Kenosha, WI (US)

(73) Assignee: Snap-on Incorporated, Kenosha, WI (US)

( * ) Notice: Subject to any disclaimer, the term of this patent is extended or adjusted under 35 U.S.C. 154(b) by 114 days.

(21) Appl. No.: 17/115,044

(22) Filed: Dec. 8, 2020

(65) Prior Publication Data

US 2022/0176523 A1 Jun. 9, 2022

(51) Int. Cl.

*F21V 33/00* (2006.01)
*B25B 21/02* (2006.01)
*B25B 23/00* (2006.01)
*B25F 5/00* (2006.01)

(52) U.S. Cl.

CPC ........ *B25B 21/026* (2013.01); *B25B 23/0035* (2013.01)

(58) Field of Classification Search

None

See application file for complete search history.

(56) References Cited

U.S. PATENT DOCUMENTS 2,281,232 A * 4/1942 Cavanagh .............. B25D 1/005 227/128
2,285,638 A 6/1942 Amtsberg
2,285,639 A 6/1942 Amtsberg
2,341,497 A 2/1944 Amtsberg
2,373,666 A 4/1945 Emery (Continued)

FOREIGN PATENT DOCUMENTS

CN 85106534 U 3/1987
CN 1206647 A 2/1999

(Continued)

OTHER PUBLICATIONS

Taiwan Office Action for corresponding Application No. 11120199600 dated Mar. 2, 2022, 10 pages.

(Continued)

*Primary Examiner* — Tanzim Imam
(74) *Attorney, Agent, or Firm* — Taft Stettinius & Hollister LLP

(57) ABSTRACT

An impact mechanism for a rotary impact tool including a centering component, a gear carrier adapted to receive rotational force from the motor and including a gear carrier aperture adapted to receive the centering component, an anvil rotatable about the central axis and including an impact section and an anvil aperture adapted to receive the centering component, and a hammer slidably coupled to the gear carrier, rotatable about a central axis, and defining a planar surface, the hammer including a lug extending from the planar surface. The centering component functions as a pilot between the gear carrier and anvil. The centering component can include an axial bore. Axial clearance and a slip-fit can be provided between the gear carrier and the centering component and between the anvil and the dowel to allow the hollow dowel to move axially.

13 Claims, 5 Drawing Sheets

(56) References Cited

U.S. PATENT DOCUMENTS

| | | | | | |
|---|---|---|---|---|---|
| 2,543,979 | A * | 3/1951 | Maurer | B25B 23/1453 192/150 |
| 3,606,931 | A * | 9/1971 | Karden | B25B 21/026 173/93.5 |
| 3,610,344 | A | 10/1971 | Schoeps et al. | |
| 3,648,784 | A | 3/1972 | Schoeps | |
| 3,675,726 | A | 7/1972 | Schoeps et al. | |
| 4,002,012 | A | 1/1977 | Schoeps | |
| 6,003,618 | A | 12/1999 | Wallace | |
| 6,047,779 | A * | 4/2000 | Wallace | B25B 21/026 173/93.5 |
| 6,158,526 | A | 12/2000 | Ghode et al. | |
| 6,457,535 | B1 | 10/2002 | Tanaka | |
| 8,381,831 | B2 * | 2/2013 | Sekino | B25F 5/001 173/48 |
| 2014/0338942 | A1 | 11/2014 | Putney | |
| 2018/0318998 | A1 | 11/2018 | Duncan et al. | |
| 2020/0198100 | A1 * | 6/2020 | Schneider | B25B 21/02 |

FOREIGN PATENT DOCUMENTS

| | | | | |
|---|---|---|---|---|
| CN | 1970206 | A | 5/2007 | |
| CN | 1978148 | A | 6/2007 | |
| CN | 200977641 | Y | 11/2007 | |
| CN | 204505189 | U | 7/2015 | |
| CN | 106166730 | A | 11/2016 | |
| GB | 851370 | A | 10/1960 | |
| GB | 1047653 | A | 11/1966 | |
| GB | 1276258 | A | 6/1972 | |
| GB | 2516530 | A | 1/2015 | |
| JP | 2006281365 | A | 10/2006 | |
| TW | 396093 | | 7/2000 | |
| WO | WO-2011010497 | A1 * | 1/2011 | B25B 21/00 |

OTHER PUBLICATIONS

United Kingdom Office Action for corresponding Application No. GB2116768.9 dated May 11, 2022, 4 pages.

United Kingdom Examination Report for corresponding UK Application No. GB2116768.9, dated Nov. 3, 2022, 3 pages.

Australian Examination Report No. 1 for corresponding UA Application No. 2021269384, dated Nov. 21, 2022, 4 pages.

Combined Search and Examination Report for corresponding Application No. GB2304069.4 dated May 31, 2023, 5 pages.

Australian Examination Report No. 2 for corresponding Application No. 2021269384 dated Jun. 14, 2023, 3 pages.

Canadian Examination Report for corresponding Application No. 3,140,824 dated Aug. 23, 2023, 5 pages.

Chinese Office Action for corresponding CN Application No. 2021114814289, dated Jan. 11, 2024, 11 pages.

Australian Examination Report No. 4 for corresponding AU Application No. 2021269384, dated Nov. 3, 2023, 6 pages.

* cited by examiner

IMPACT MECHANISM FOR A ROTARY IMPACT TOOL

TECHNICAL FIELD

The present application relates generally to tools for driving fasteners, and more particularly to an impact mechanism for a rotary impact tool.

BACKGROUND

A variety of tools are commonly used to apply torque to a workpiece, such as a threaded fastener. One such tool, known as an impact driver or tool, which is commonly used to remove fasteners, such as, for example, lug nuts on a vehicle wheels. Often, the fasteners, such as lug nuts, are corroded or otherwise difficult to remove. An impact driver eases such removal.

The impact driver is designed to deliver high torque output by storing energy in a rotating mass, then delivering it suddenly in a repetitive impacting fashion to the output shaft. In operation, a rotating mass, known as a hammer, is accelerated by a gear carrier coupled to a motor, storing energy, then suddenly connected to the output shaft, the anvil, creating a high-torque impact. The hammer mechanism is designed such that after delivering the impact, the hammer is again allowed to spin freely from the anvil. As such the only reaction force applied to the body of the tool is the motor accelerating the hammer, and thus the operator feels very little torque, even though a very high peak torque is delivered to the output shaft. The traditional hammer design requires a certain minimum torque before the hammer is allowed to spin separately from the anvil, causing the tool to stop hammering and instead smoothly drive the fastener if only low torque is needed, thereby rapidly rotating the fastener.

Traditional impact tools include a gear carrier having a protrusion, also referred to as a pilot, adapted to center the gear carrier and the anvil. This results in a stress concentration at a transition radius as the gear carrier transitions from a larger to a smaller diameter at the protrusion. Accordingly, cyclical bending loads imparted on the protrusion during repeated use of the tool eventually causes failure at the transition radius.

Typical impact tools use extra processing (such as, for example, shot peening) of the protrusion, larger diameter protrusions, shorter protrusion lengths, constructing the protrusion out of stronger material, and/or utilizing heat-treatment processes to increase ultimate strength and fatigue strength. However, these solutions still require replacement of the entire gear carrier when the protrusion inevitably fails.

SUMMARY

The present invention relates broadly to an impact mechanism for a rotary impact tool, such as an impact driver that is powered by a fluid, such as air or hydraulic fluid, or by electricity via an external power source (such as a wall outlet and/or generator outlet) or a battery. The impact mechanism has a separate centering component, such as a dowel, that radially aligns the gear carrier and anvil. The centering component eliminates the need for the gear carrier to have a conventional protrusion (pilot), so there are no stress concentrations as the gear carrier transitions from a large to a small diameter. The impact mechanism of the present invention further allows for replacement of only the centering component without requiring the removal and/or replacement of the gear carrier.

In an embodiment, the present invention broadly comprises an impact mechanism for an impact tool. The impact mechanism includes a gear carrier including a gear carrier aperture, an anvil rotatable about an axis and including an impact section and an anvil aperture, a centering component slidably received in the gear carrier aperture and the anvil aperture, thereby radially aligning and coupling the gear carrier and anvil, and a hammer slidably coupled to the gear carrier and is rotatable about the axis and includes a planar surface with a lug extending therefrom.

In another embodiment, the present invention broadly comprises an impact tool including a motor and an impact mechanism. The impact mechanism includes a gear carrier adapted to receive rotational force from the motor and including a gear carrier aperture, an anvil rotatable about an axis and including an impact section and an anvil aperture, a centering component slidably received in the gear carrier aperture and the anvil aperture, thereby radially aligning and coupling the gear carrier and anvil, and a hammer slidably coupled to the gear carrier and is rotatable about the axis and includes a planar surface with a lug extending therefrom.

BRIEF DESCRIPTION OF THE DRAWINGS

For the purpose of facilitating an understanding of the subject matter sought to be protected, there are illustrated in the accompanying drawings embodiments thereof, from an inspection of which, when considered in connection with the following description, the subject matter sought to be protected, its construction and operation, and many of its advantages should be readily understood and appreciated.

DETAILED DESCRIPTION

Figure 1:
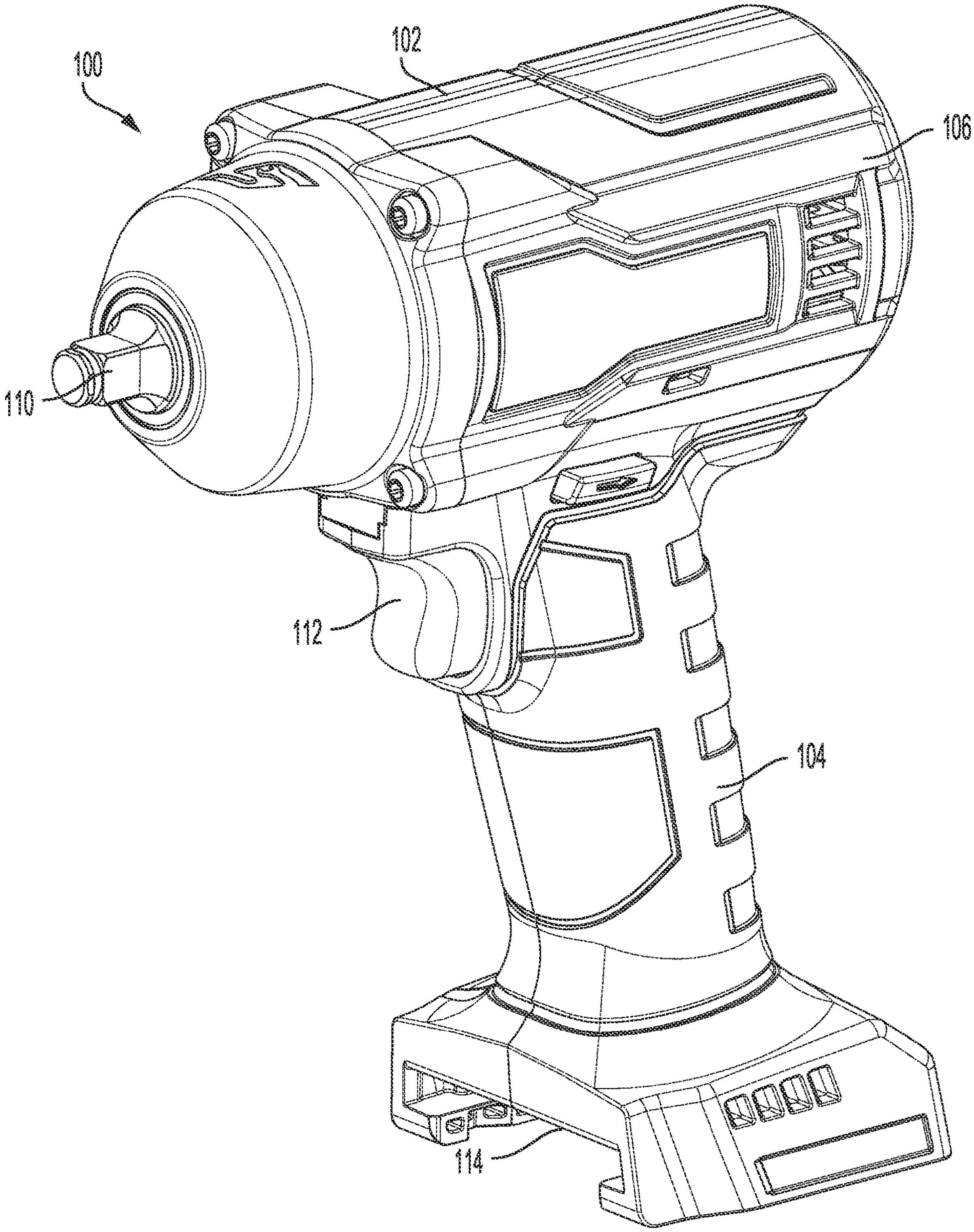
FIG. 1 is a perspective view of an impact tool, according to an embodiment of the present invention.

While this invention is susceptible of embodiments in many different forms, there is shown in the drawings, and will herein be described in detail, a preferred embodiment of the invention with the understanding that the present disclosure is to be considered as an exemplification of the principles of the invention and is not intended to limit the broad aspect of the invention to embodiments illustrated. As used herein, the term "present invention" is not intended to limit the scope of the claimed invention and is instead a term used to discuss exemplary embodiments of the invention for explanatory purposes only.

The present invention broadly comprises an impact mechanism for a rotary impact tool. The impact mechanism includes a centering component, such as, for example, a dowel, a gear carrier, and an anvil. The centering component radially aligns and centers the gear carrier and the anvil. In an embodiment, an axial clearance and a slip-fit tolerance is provided between the gear carrier and the centering component and/or between the anvil and the centering component to allow the centering component to move axially, thereby minimizing cyclical bending load being applied to the same location on the centering component due to repeated use of the tool.

Figure 2:
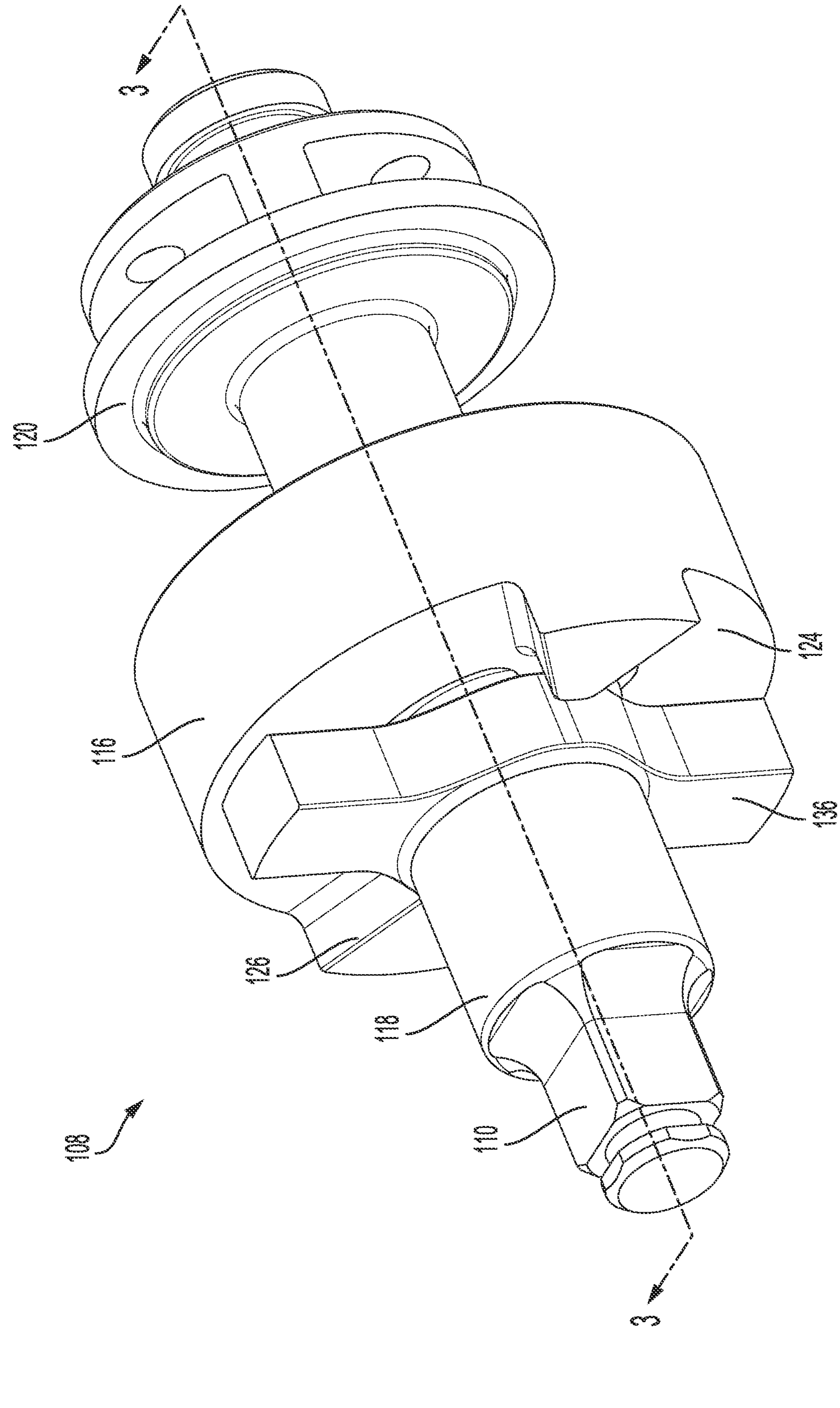
FIG. 2 is a perspective view of an impact mechanism, according to an embodiment of the present invention.
Figure 3:
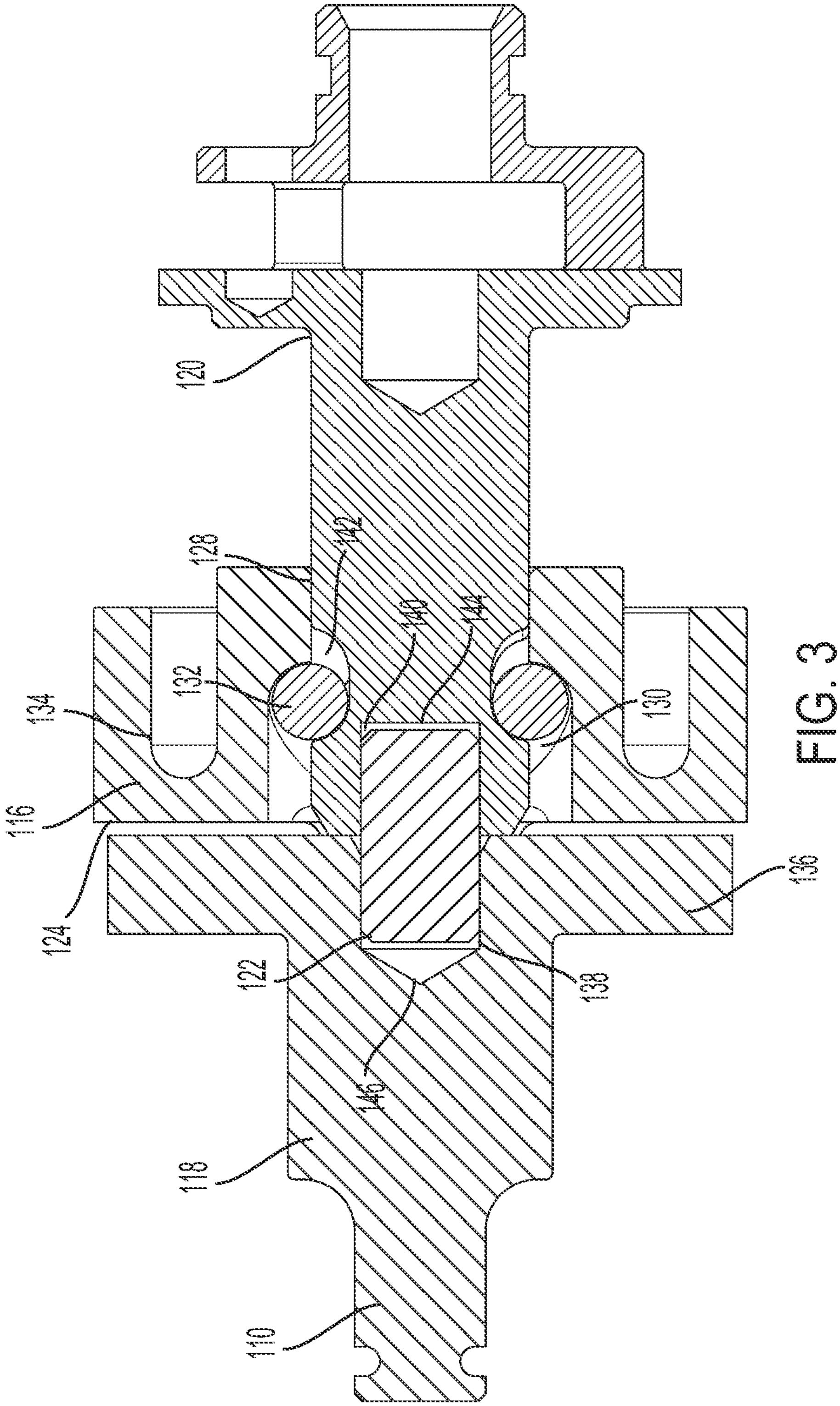
FIG. 3 is a sectional view of the impact mechanism of FIG. 2 taken along line 3-3 of FIG. 2.

Referring to FIGS. 1-3, an impact tool 100, such as, for example, an impact driver, having a housing 102 including a handle portion 104 and a motor housing portion 106. A motor (not shown) and an impact mechanism 108 are disposed in the motor housing portion 106. The impact mechanism 108 may include or be coupled to an output drive 110, all in a known manner. A trigger 112 for controlling operation of the impact tool 100 is disposed on the handle portion 104 adjacent to the motor housing portion 106. Depression of the trigger 112 causes rotation of the output drive 110 in either the clockwise or counter-clockwise directions. A suitable tool, such as a socket or the like, may be coupled to the output drive 110 for interfacing with an associated fastener or the like, to which torque is to be applied. In an embodiment, the impact tool 100 is powered by a battery (not shown), which may be detachably mountable at a battery interface 114 of the handle portion 104. In another embodiment, the impact tool 100 is powered by fluid, such as, for example, hydraulic fluid or air.

The impact mechanism 108 includes a hammer 116, an anvil 118, a gear carrier 120, and a centering component 122. A slip-fit tolerance can be implemented between the gear carrier 120 and the centering component 122 and/or between the anvil 118 and the centering component 122. This allows the hammer 116 and the anvil 118 to spin relative to one another when the minimum torque is reached. This also allows the interface with the least amount of friction (best lubrication) to slide rotationally.

The hammer 116 includes a planar surface 124 rotatable about a central axis and one or more hammer lugs 126 extending from the planar surface 124. The hammer 116 is slidably coupled to the gear carrier 120, which is adapted to receive rotational force from the motor. In an embodiment, the hammer 116 includes an aperture 128 adapted to receive the gear carrier 120. The hammer aperture 128 includes a ball groove 130 adapted to receive one or more balls 132. The hammer 116 also includes a biasing member groove 134 adapted to receive a biasing member (not shown). The biasing member can be, for example, a spring, and is adapted to apply a bias force to axially bias the hammer 116 towards the anvil 118.

The anvil 118 includes one or more impact sections 136 extending from a central axis. The anvil further includes or is coupled to an output drive 110 to which a tool, such as a socket, may be attached directly or indirectly. The impact sections 136 are adapted to receive impact force from the hammer lugs 126 to drive the output drive 110. The anvil 118 also includes an anvil blind bore formed by an anvil aperture 138 that terminates at a second end wall 146 of the anvil aperture 138, wherein the anvil aperture 138 is adapted to receive the centering component 122.

The gear carrier 120 is adapted to receive rotational force from the motor and transfer the rotational force to the hammer 116. The gear carrier 120 includes a gear carrier blind bore formed by a gear carrier aperture 140 that terminates at a first end wall 144 of the gear carrier aperture 140, wherein the gear carrier aperture 140 is adapted to receive the centering component 122. In an embodiment (not shown), the gear carrier 120 includes a through hole to allow venting and to aid in removal of the centering component 122. The gear carrier 120 can include a circumferential groove 142 adapted to receive the balls 132, the circumferential groove 142 and the ball groove 130 adapted to axially move the hammer 116 away from the anvil 118 when a minimum torque is reached, as discussed in more detail below.

The centering component 122 is disposed in the anvil aperture 138 and the gear carrier aperture 140 to radially align the gear carrier 120 and the anvil 118. The centering component 122 can be slidably received by the anvil aperture 138 and/or the gear carrier aperture 140 using a slip-fit tolerance. The centering component 122 can be, for example, a dowel pin. The centering component 122 can be made from a different material or a different grade of steel that does not necessarily have the same properties as required for other locations on the gear carrier 120. In an embodiment, the centering component 122 has different properties than the gear carrier 120, such as, for example, a higher strength material that may be too brittle for the other locations on the gear carrier. In another embodiment, only the centering component 122 undergoes a cold working process, such as, for example, shot peening. This saves additional processing and cost of manufacturing the gear carrier 120.

The gear carrier aperture 140 and the anvil aperture 138 are sized to provide axial clearance between the first end of the centering component 122 and a first end wall 144 of the gear carrier aperture 140 and/or between the second end of the centering component 122 and a second end wall 146 of the anvil aperture 138. By providing axial clearance between the centering component 122 and the anvil 118 and between the centering component 122 and the gear carrier 120, the centering component 122 is adapted to be axially movable relative to the anvil 118 and the gear carrier 120. This axial movement allows the centering component 122 to be subjected to stresses in different locations along its length during operation of the impact tool 100, thereby limiting fatigue by not repeating the stresses in the same location.

During use of the impact tool 100 (i.e., when the trigger 112 is actuated by an operator), the motor drives the hammer 116 and the gear carrier 120 in either one of clockwise or counter-clockwise directions, which causes the hammer lugs 126 to contact the impact sections 136 to drive the anvil 118 and the output drive 110 in the desired clockwise or counter-clockwise direction. Once the torque required to drive the output drive 110 exceeds the minimum torque, the gear carrier 120 rotates at a faster velocity than the hammer 116 and the anvil 118, thereby causing the balls 132 to traverse along the ball groove 130 and the circumferential groove 142. As the balls 132 traverse along the ball groove 130 and the circumferential groove 142, the hammer 116 overcomes the bias force applied by the biasing member and moves in an axial direction away from the anvil 118 until the hammer lugs 126 no longer contact the impact sections 136. Once the hammer lugs 126 no longer contact the impact sections 136, the bias member causes the hammer 116 to move axially towards the anvil 118 and deliver a sudden rotational impact force to the anvil 118 and, consequently, the output drive 110.

Figure 4:
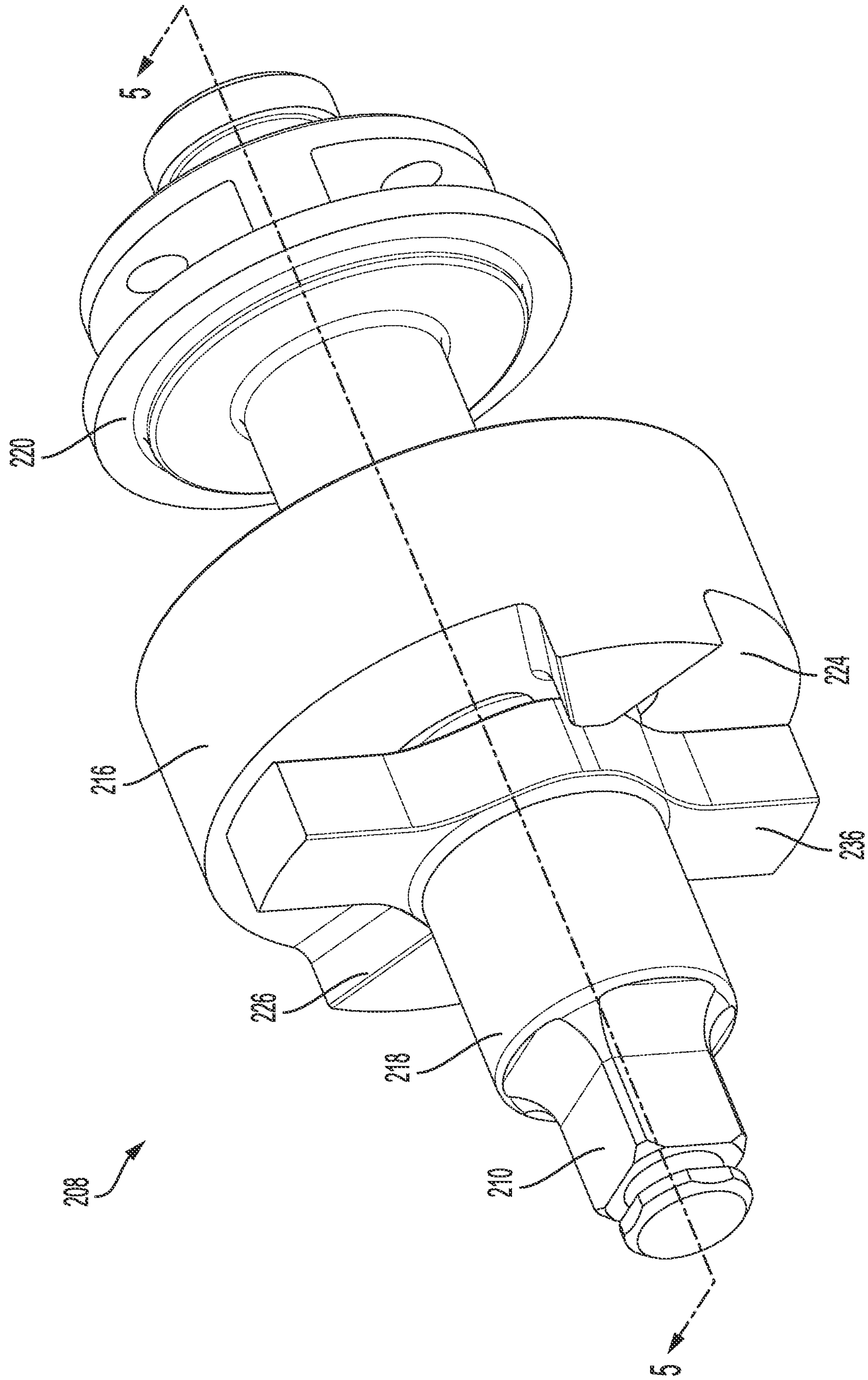
FIG. 4 is a perspective view of an impact mechanism, according to another embodiment of the present invention.
Figure 5:
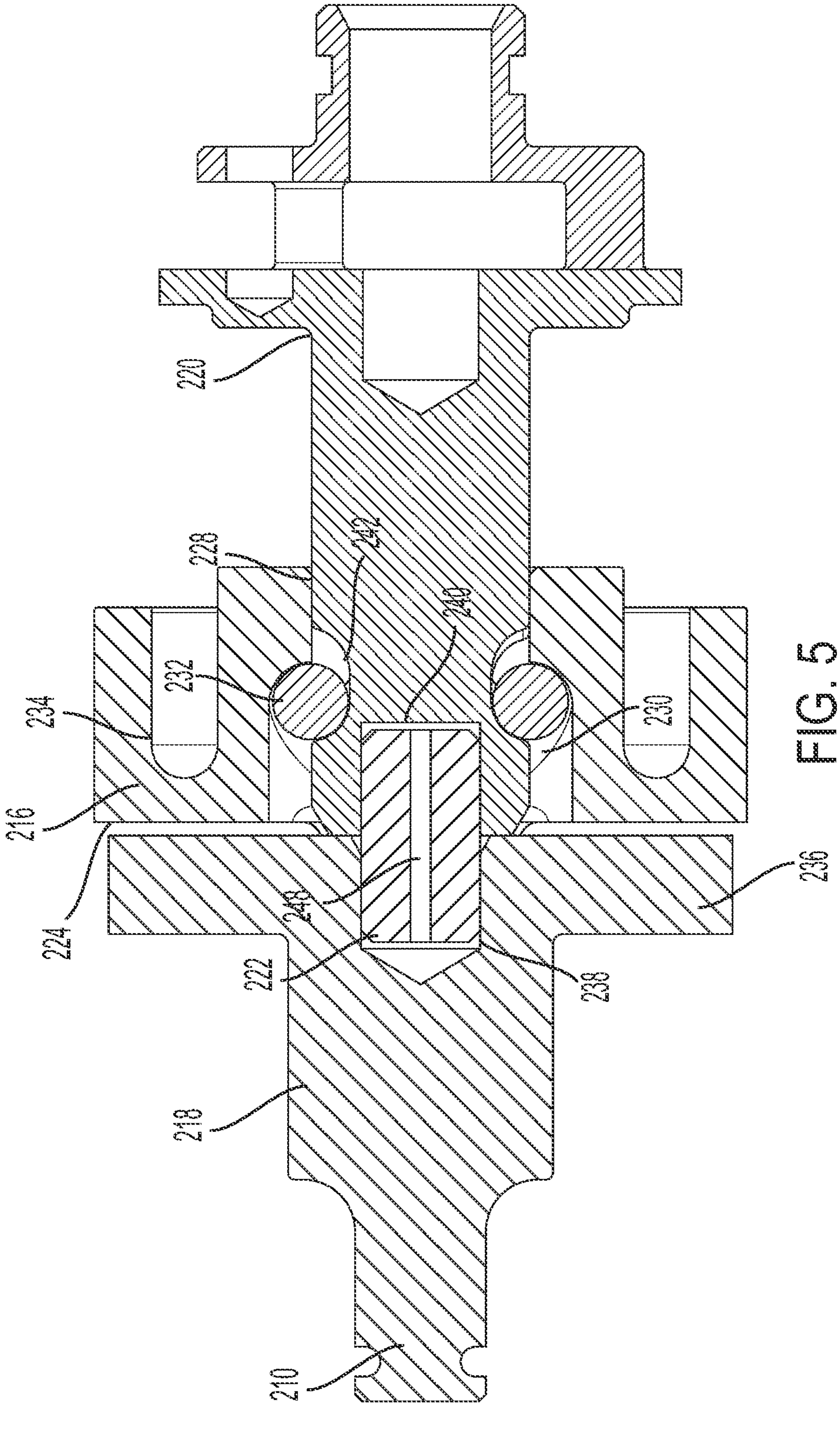
FIG. 5 is a sectional view of the impact mechanism of FIG. 4 taken along line 5-5 of FIG. 4.

In another embodiment, as shown in FIGS. 4 and 5, an impact mechanism 208 (which is substantially similar to the impact mechanism 108 described above) includes a hammer 216, an anvil 218, a gear carrier 220, and a centering component 222 (which are substantially similar to the hammer 116, an anvil 118, a gear carrier 120, and a centering component 122 as described above, except the centering component 222 includes an axial bore 248, as shown in FIG. 5.

Similar to the hammer 116 described above, the hammer 216 includes a planar surface 224 rotatable about a central axis and one or more hammer lugs 226 extending from the planar surface 224. The hammer 216 is slidably coupled to the gear carrier 220, which is adapted to receive rotational force from the motor. In this embodiment, the hammer 216 includes an aperture 228 adapted to receive the gear carrier 220. Similar to the hammer aperture 128 described above, the hammer aperture 228 includes a ball groove 230 adapted to receive one or more balls 232, which substantially correspond to the ball groove 130 and the balls 132 described above. The hammer 216 also includes a biasing member groove 234, which is substantially similar to the biasing member groove 134 described above, adapted to receive a biasing member (not shown). The biasing member can be, for example, a spring, and is adapted to apply a bias force to axially bias the hammer 216 towards the anvil 218.

Similar to the anvil 118 described above, the anvil 218 includes one or more impact sections 236 extending from a central axis, which substantially correspond to the one or more impact sections 136 described above. Similar to the anvil 118 described above, the anvil 218 further includes or is coupled to an output drive 210, which substantially corresponds to the output drive 110 described above Similar to the anvil 118 described above, the anvil 218 also includes an anvil aperture 238, which substantially corresponds to the anvil aperture 138 described above, adapted to receive the centering component 222.

Similar to the gear carrier 120 described above, the gear carrier 220 includes a gear carrier aperture 240, which substantially corresponds to the gear carrier aperture 140 described above, adapted to receive the centering component 222. Similar to the gear carrier 120 described above, the gear carrier 220 can include a circumferential groove 242 adapted to receive the balls 232, which substantially corresponds to the circumferential groove 142 described above.

In the present embodiment, the centering component 222 includes an axial bore 248. Similar to the centering component 122 described above, the centering component 222 is disposed in the anvil aperture 238 and the gear carrier aperture 240 to radially align the gear carrier 220 and the anvil 218. The centering component 222 can be slidably received by the anvil aperture 238 and/or the gear carrier aperture 240 using a slip-fit tolerance Similar to the centering component 122 described above, the centering component 222 can be, for example, a dowel pin.

In the present embodiment, the axial bore 248 in the centering component 222 vents air or gasses trapped inside the anvil aperture 238 and/or the gear carrier aperture 240. Additionally, the axial bore 244 allows lubrication to be applied to the close-fit interface between the centering component 222 and the anvil aperture 238. Similar to the centering component 122 described above, a slip-fit tolerance can be implemented between the gear carrier 220 and the centering component 222 and/or between the anvil 218 and the centering component 222. This allows the hammer 216 and the anvil 218 to spin relative to one another when the minimum torque is reached. This also allows the interface with the least amount of friction (best lubrication) to slide rotationally.

As used herein, the term "coupled" and its functional equivalents are not intended to necessarily be limited to direct, mechanical coupling of two or more components. Instead, the term "coupled" and its functional equivalents are intended to mean any direct or indirect mechanical, electrical, or chemical connection between two or more objects, features, work pieces, and/or environmental matter. "Coupled" is also intended to mean, in some examples, one object being integral with another object.

The matter set forth in the foregoing description and accompanying drawings is offered by way of illustration only and not as a limitation. While particular embodiments have been shown and described, it will be apparent to those skilled in the art that changes and modifications may be made without departing from the broader aspects of the inventors' contribution. The actual scope of the protection sought is intended to be defined in the following claims when viewed in their proper perspective based on the prior art.

What is claimed is:

1. An impact mechanism for an impact tool, comprising:

a gear carrier including a gear carrier blind bore formed by a gear carrier aperture extending into the gear carrier and terminating at a first end wall within the gear carrier;

an anvil rotatable about an axis and including an impact section and an anvil blind bore formed by an anvil aperture extending into the anvil and terminating at a second end wall within the anvil;

a centering component including opposing first and second end surfaces respectively slidably received in the gear carrier aperture and the anvil aperture, wherein the centering component includes an axial bore, and wherein the centering component is disposed between the first and second end walls, thereby radially aligning and coupling the gear carrier and the anvil; and a hammer slidably coupled to the gear carrier, rotatable about the axis, and including a planar surface with a lug extending therefrom.

2. The impact mechanism of claim 1, wherein the centering component is slidably received in the gear carrier aperture and the anvil aperture using a slip-fit tolerance.

3. The impact mechanism of claim 1, wherein a first axial clearance is provided between the first end surface and the first end wall and a second axial clearance is provided between the second end surface and the second end wall.

4. The impact mechanism of claim 1, wherein the gear carrier includes a through hole.

5. The impact mechanism of claim 1, further comprising a ball that engages a ball groove disposed on the hammer and a circumferential groove disposed on the gear carrier.

6. The impact mechanism of claim 1, wherein the anvil includes an output drive.

7. An impact tool comprising:

a motor; and an impact mechanism including:

a gear carrier adapted to receive rotational force from the motor and including a gear carrier blind bore formed by a gear carrier aperture extending into the gear carrier and terminating at a first end wall within the gear carrier;

an anvil rotatable about an axis and including an impact section and an anvil blind bore formed by an anvil aperture extending into the anvil and terminating at a second end wall within the anvil;

a centering component including opposing first and second end surfaces respectively slidably received in the gear carrier aperture and the anvil aperture, wherein the centering component includes an axial bore, and wherein the centering component is disposed between the first and second end walls, thereby radially aligning and coupling the gear carrier and the anvil; and a hammer slidably coupled to the gear carrier, rotatable about the axis, and including a planar surface with a lug extending therefrom.

8. The impact tool of claim 7, wherein the impact tool is an impact driver.

9. The impact tool of claim 7, wherein the centering component is slidably received in the gear carrier aperture and the anvil aperture using a slip-fit tolerance.

10. The impact tool of claim 7, wherein a first axial clearance is provided between the first end surface and the first end wall and a second axial clearance is provided between the second end surface and the second end wall.

11. The impact tool of claim 7, wherein the gear carrier includes a through hole.

12. The impact tool of claim 7, further comprising a ball disposed in a ball groove of the hammer and a circumferential groove of the gear carrier.

13. The impact tool of claim 7, wherein the anvil is coupled to an output drive.

* * * * *